United States Patent
Yu et al.

(10) Patent No.: US 11,308,611 B2
(45) Date of Patent: Apr. 19, 2022

(54) REDUCING FALSE POSITIVE DETECTIONS OF MALIGNANT LESIONS USING MULTI-PARAMETRIC MAGNETIC RESONANCE IMAGING

(71) Applicant: Siemens Healthcare GmbH, Erlangen (DE)

(72) Inventors: Xin Yu, Plainsboro, NJ (US); Bin Lou, Princeton, NJ (US); Bibo Shi, Monmouth Junction, NJ (US); David Jean Winkel, Hoboken, NJ (US); Ali Kamen, Skillman, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 119 days.

(21) Appl. No.: 16/782,201

(22) Filed: Feb. 5, 2020

(65) Prior Publication Data
US 2021/0110534 A1  Apr. 15, 2021

Related U.S. Application Data

(60) Provisional application No. 62/912,709, filed on Oct. 9, 2019.

(51) Int. Cl.
*G06K 9/62* (2022.01)
*G06T 7/00* (2017.01)
*G06V 10/40* (2022.01)

(52) U.S. Cl.
CPC ............ *G06T 7/0012* (2013.01); *G06V 10/40* (2022.01); *G06T 2207/10088* (2013.01);
(Continued)

(58) Field of Classification Search
CPC ........ G06T 7/0012; G06T 2207/10088; G06T 2207/20081; G06T 2207/20084;
(Continued)

(56) References Cited

U.S. PATENT DOCUMENTS 7,736,313 B2  6/2010 Luo et al.
9,532,762 B2  1/2017 Cho et al.
(Continued)

FOREIGN PATENT DOCUMENTS

CN  101061490 A  10/2007
CN  106778005 A  5/2017
(Continued)

OTHER PUBLICATIONS

Miller et al., "Cancer Treatment and Survivorship Statistics", CA: A Cancer Journal for Clinicians, 2019, vol. 69, No. 5, pp. 363-385.
(Continued)

*Primary Examiner* — Siamak Harandi

(57) ABSTRACT

Systems and methods for reducing false positive detections of malignant lesions are provided. A candidate malignant lesion is detected in one or more medical images, such as, e.g., multi-parametric magnetic resonance images. One or more patches associated with the candidate malignant lesion are extracted from the one or more medical images. The candidate malignant lesion is classified as being a true positive detection of a malignant lesion or a false positive detection of the malignant lesion based on the one or more extract patches using a trained machine learning network. The results of the classification are output.

20 Claims, 6 Drawing Sheets

(52) U.S. Cl.
CPC ............... *G06T 2207/20081* (2013.01); *G06T 2207/20084* (2013.01); *G06T 2207/30081* (2013.01); *G06T 2207/30096* (2013.01)

(58) Field of Classification Search
CPC . G06T 2207/30081; G06T 2207/30096; G06T 2207/20132; G06K 9/46; G06K 9/629; G06K 2209/05; G06K 9/6271; G06K 9/4623; G16H 30/20; G06V 10/40; G06V 10/82; G06V 10/451; G06V 2201/03
See application file for complete search history.

(56) References Cited

U.S. PATENT DOCUMENTS

| | | |
|---|---|---|
| 10,489,908 B2 | 11/2019 | Kiraly et al. |
| 2009/0175531 A1 | 7/2009 | Boroczky et al. |
| 2010/0067754 A1* | 3/2010 | Collins ................. G06T 7/0012 382/128 |
| 2018/0260957 A1 | 9/2018 | Yang et al. |
| 2019/0236782 A1* | 8/2019 | Amit ................. A61B 10/0041 |

FOREIGN PATENT DOCUMENTS

| | | |
|---|---|---|
| JP | 2008520345 A | 6/2008 |
| KR | 20150098119 A | 8/2015 |
| KR | 20190084426 A | 7/2019 |
| WO | 2019238804 A1 | 12/2019 |

OTHER PUBLICATIONS

Litjens et al., "Computer-Aided Detection ~Of Prostate Cancer in MRI", IEEE Transactions on Medical Imaging, 2014, vol. 33, No. 5, pp. 1083-1092.
Cao et al., "Joint Prostate Cancer Detection and Gleason Score Prediction in MP-MRI Via Focalnet", IEEE Transactions on Medical Imaging, 2019, pp. 1-11.
Weinreb et al., "Pi-rads Prostate Imaging-Reporting and Data System: 2015, Version 2", European Urology, 2016, vol. 69, No. 1, pp. 16-40.
Ahmed et al., "Diagnostic Accuracy of Multi-Parametric MRI and TRUS Biopsy in Prostate Cancer (PROMIS): A Paired Validating Confirmatory Study", The Lancet 2017, vol. 389, pp. 815-822.
Dou et al., "Multilevel Ontextual 3-d CNNs for False Positive Reduction in Pulmonary Nodule Detection", IEEE Transactions on Biomedical Engineering, 2016, vol. 64, No. 7, pp. 1558-1567.
Kim et al., "Multi-Scale Gradual Integration CNN for False Positive Reduction in Pulmonary Nodule Detection", Neural Networks, 2019. vol. 115, pp. 1-11.
Wen et al., "A Discriminative Feature Learning Approach for Deep Face Recognition", European Conference on Computer Vision, Springer, 2016, pp. 499-515.
Loffroy et al., "Current Role of Multiparametric Magnetic Resonance Imaging for Prostate Cancer", Quantitative Imaging in Medicine and Surgery, 2015, vol. 5, No. 5, pp. 754-764.
Kuhl et al., "Abbreviated Biparametric Prostate MR Imaging in Men with Elevated Prostatespecific Antigen", Radiology, 2017, vol. 285, No. 2, pp. 493-505.
Zhang et al., "Multicontext 3D Residual CNN for False Positive Reduction of Pulmonary Nodule Detection", International Journal of Imaging Systems and Technology, 2019, vol. 29, No. 1, pp. 42-49.
Purysko et al., "PI-RADS Version 2: A Pictorial Update", Radiographics, 2016, vol. 36, No. 5, pp. 1354-1372.
Ronneberger et al., "U-Net: Convolutional Networks for Biomedical Image Segmentation", in International Conference on Medical Image Computing and Computer Assisted Intervention, Springer, 2015, pp. 234 241.
He et al., "Deep Residual Learning for Image Recognition", IEEE Conference on Computer Vision and Pattern Recognition (CVPR), 2015, pp. 770-778.
Hu et al., "Squeeze-and-Excitation Networks", Proceedings of the IEEE Conference on Computer Vision and Pattern Recognition, 2018, pp. 7132-7141.
Kiraly et al., "Deep Convolutional Encoder-Decoders for Prostate Cancer Detection and Classification", International Conference on Medical Image Computing and Computer-Assisted Intervention, Springer, 2017, pp. 489-497.
Yang et al., "Automatic Liver Segmentation Using an Adversarial Image-to-Image Network," International Conference on Medical Image Computing and Computer-Assisted Intervention, Springer, 2017, pp. 507-515.
European Office Action dated Mar. 5, 2021 in corresponding European Patent Application No. 20200765.4.
Roth, Holger R. et al:"Efficient False Positive Reduction in Computer-Aided Detection Using Convolutional Neural Networks and Random View Aggregation";Springer International Publishing Switzerland 2017.
Chen, Quan et al:"A Transfer learning approach for classification of clinical significant prostate cancers from mpMRI scans";Medical Imaging 2017.

* cited by examiner

Receive one or more input medical images of a patient
202

↓

Detect a candidate malignant lesion from the one or more input medical image
204

↓

Extract one or more patches associated with the candidate malignant lesion from the one or more input medical images
206

↓

Classify the candidate malignant lesion as being a true positive detection of a malignant lesion or a false positive detection of the malignant lesion based on the one or more extracted patches using a trained machine learning network
208

↓

Output results of the classification
210

| Settings | Samples | Components | Cases |
|---|---|---|---|
| w/o FPR | / | / | 0.825 |
| baseline | 0.866 | 0.829 | 0.842 |
| baseline+2.5D | 0.879 | 0.837 | 0.844 |
| Proposed w/o CL & SE | 0.887 | 0.844 | 0.863 |
| Proposed w/o CL | 0.895 | 0.867 | 0.868 |
| Proposed w/o SE | 0.891 | 0.867 | 0.868 |
| Proposed | 0.897 | 0.876 | 0.867 |
| State of the Art | 0.876 | 0.847 | 0.857 |

REDUCING FALSE POSITIVE DETECTIONS OF MALIGNANT LESIONS USING MULTI-PARAMETRIC MAGNETIC RESONANCE IMAGING

CROSS-REFERENCE TO RELATED APPLICATIONS

This application claims the benefit of U.S. Provisional Application No. 62/912,709, filed Oct. 9, 2019, the disclosure of which is herein incorporated by reference in its entirety.

TECHNICAL FIELD

The present invention relates generally to reducing false positive detections of malignant lesions, and more particularly to reducing false positive detections of malignant lesions for prostate cancer detection using multi-parametric magnetic resonance imaging.

BACKGROUND

Prostate cancer is one of the most prevalent forms of cancer. Diagnosis of prostate cancer traditionally involves screening patients experiencing prostate cancer symptoms by administering a prostate specific antigen (PSA) blood test and, for patients with an elevated PSA, performing a biopsy to confirm the prostate cancer diagnosis. However, the PSA blood test has a high rate of over diagnosis of prostate cancer, resulting in unnecessary and invasive intervention of the patient and increase in medical costs.

Recently, multi-parametric magnetic resonance imaging (mpMRI) has been proposed for the detection, localization, and classification of prostate cancer. Conventional techniques for computer-aided detection of prostate cancer using mpMRI images have been found to achieve comparable detection sensitivity as compared to a radiologist, however with a relatively lower specificity. Such lower specificity results in over diagnosis of prostate cancer, also resulting in unnecessary and invasive intervention of the patient and increase in medical costs.

BRIEF SUMMARY OF THE INVENTION

In accordance with one or more embodiments, systems and methods for reducing false positive detections of malignant lesions are provided. A candidate malignant lesion is detected in one or more medical images, such as, e.g., multi-parametric magnetic resonance images. One or more patches associated with the candidate malignant lesion are extracted from the one or more medical images. The candidate malignant lesion is classified as being a true positive detection of a malignant lesion or a false positive detection of the malignant lesion based on the one or more extracted patches using a trained machine learning network. The results of the classification are output.

In one embodiment, a plurality of patches having different fields of view are extracted from the one or more medical images. For example, the plurality of patches may be extracted by cropping the one or more medical images at different dimensions. In one embodiment, a patch depicting the candidate malignant lesion from a particular image of the one or more medical images and patches from images of the one or more medical images that neighbor the particular image are extracted as the one or more patches associated with the candidate malignant lesion.

These and other advantages of the invention will be apparent to those of ordinary skill in the art by reference to the following detailed description and the accompanying drawings.

BRIEF DESCRIPTION OF THE DRAWINGS

FIG. 2 shows a method for reducing false positive detections of malignant lesions, in accordance with one or more embodiments;

FIG. 5 shows a table comparing various embodiments described herein; and

DETAILED DESCRIPTION

The present invention generally relates to systems and methods for reducing false positive detections for malignant lesions using multi-parametric magnetic resonance imaging (mpMRI). Embodiments of the present invention are described herein to give a visual understanding of such systems and methods. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within one or more computer systems using data stored within the computer systems.

While the embodiments described herein are described for reducing false positive detections of malignant lesions for prostate cancer, the present invention is not so limited. The embodiments described herein may be applied for reducing false positive detections of malignant lesions for any type of cancer or for reducing false positive classifications of any type of abnormality (e.g. nodules) in a medical image.

Figure 1:
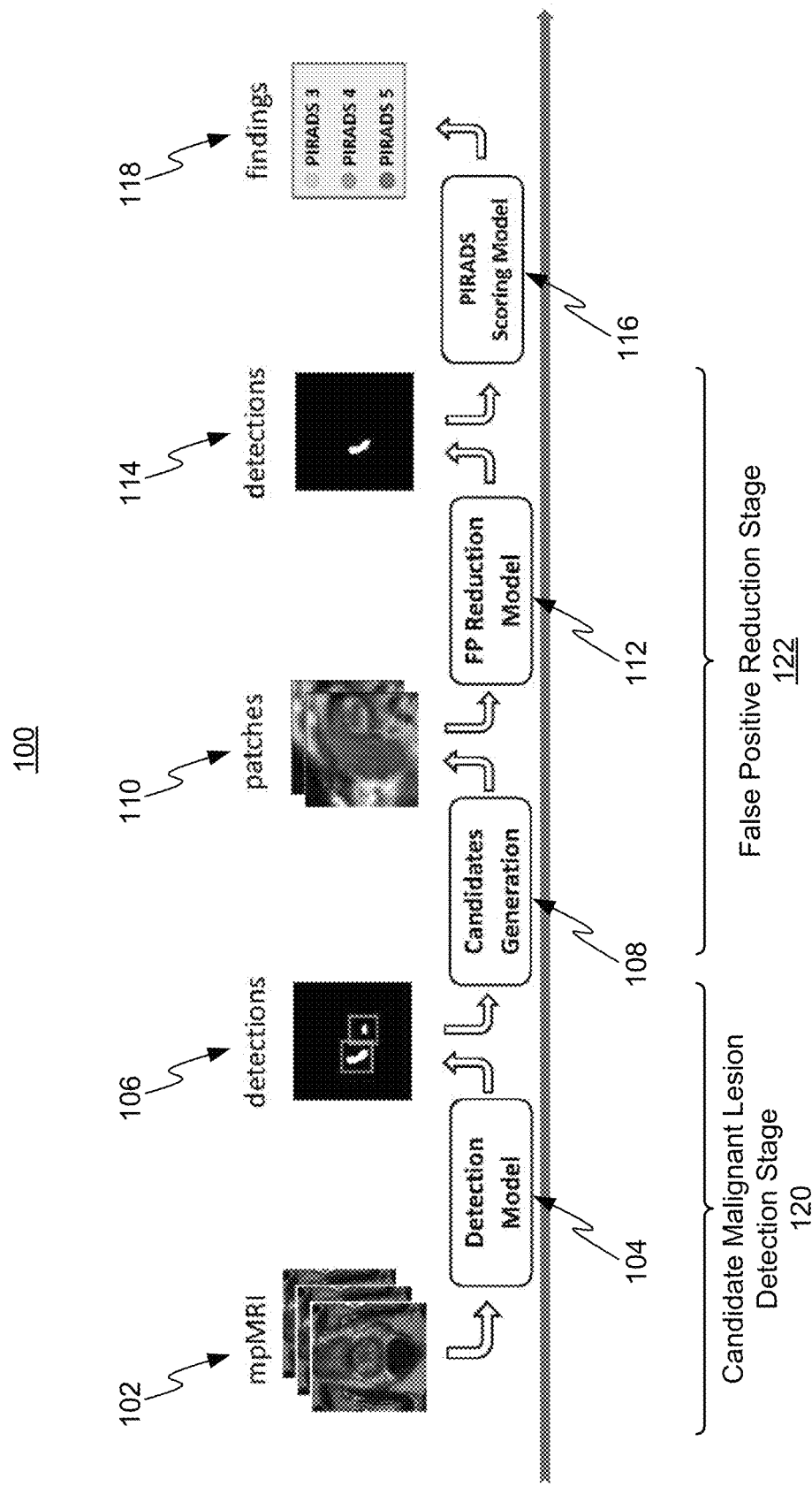
FIG. 1 shows a workflow for detecting and evaluating malignant lesions, in accordance with one or more embodiments.

FIG. 1 shows a workflow 100 for detecting and evaluating malignant lesions, in accordance with one or more embodiments. Workflow 100 comprises two stages: a candidate malignant lesion detection stage 120 and a false positive reduction stage 122. In candidate malignant lesion detection stage 120, the goal is to detect malignant lesions with a high degree of sensitivity. In false positive reduction stage 122, the goal is to minimize the false positive detection rate of the detected malignant lesions with minimal impact to the sensitivity.

In candidate malignant lesion detection stage 120, a machine learning based detection model 104 outputs detections 106 of malignant lesions in the form of a heat map from input mpMRI images 102 of a patient. Since the malignant lesions in detections 106 may be false positive detections of malignant lesions, the malignant lesions in detections 106 are considered candidate malignant lesions. In order to reduce the false positive detections of malignant lesions, false positive reduction stage 122 is applied. In false positive reduction stage 122, the malignant lesions in detections 106 are identified as candidate malignant lesions by candidates generation module 108, patches 110 associated with the candidate malignant lesions are extracted from mpMRI images 102, and a machine learning based false positive (FP) reduction model 112 classifies the candidate malignant lesions as being true positive detections of a malignant lesion or false positive detections of a malignant lesion from patches 110 and outputs results of the classification as detections 114 of malignant lesions in the form of a heat map. True positive detections of malignant lesions in detections 114 may be further evaluated by PI-RADS (prostate imaging-reporting and data system) scoring model 116 to generate findings 118 to assess the true positive malignant lesions identified in detections 114 with a score from PI-RADS 1 to PI-RADS 5 indicating the likelihood of clinically significant cancer.

Advantageously, the embodiments described herein supplement the candidate malignant lesion detection stage with the false positive reduction stage, whereby false positive reduction model 112 classifies the candidate malignant lesions identified in detections 106 of detection model 104 as true positive detections or false positive detections of malignant lesions. Accordingly, false positive reduction stage reduces false positive detections of malignant lesions of detection model 104 with minimal impact on sensitivity provided by detection model 104, thereby reducing unnecessary and invasive inventions on the patient and decreasing medical costs.

FIG. 2 shows a method 200 for reducing false positive detections of malignant lesions, in accordance with one or more embodiments. Method 200 will be described with continued reference to workflow 100 of FIG. 1 where steps 202 and 204 of FIG. 2 correspond to candidate malignant lesion detection stage 120 of FIG. 1 and steps 206, 208, and 210 of FIG. 2 correspond to false positive reduction stage 122 of FIG. 2. In one embodiment, method 200 is performed by any suitable computing device or devices, such as, e.g., computer 602 of FIG. 6.

At step 202, one or more input medical images of a patient are received. The input medical images may include images depicting lesions or other abnormalities (e.g., nodules) that may or may not be malignant. In one embodiment, the input medical images may be mpMRI slices. An mpMRI image combines a number (e.g., 8 or more) of individual images acquired under different imaging protocols. For example, the input medical images may be mpMRI images 102 of FIG. 1. However, it should be understood that the input medical images may be of any suitable modality, such as, e.g., x-ray, magnetic resonance imaging (MRI), ultrasound (US), computed tomography (CT), single-photon emission computed tomography (SPECT), positron emission tomography (PET), or any other suitable modality or combination of modalities. The input medical images may be of any suitable dimensionality, such as, e.g., two dimensional (2D), 2.5 dimensional (2.5D), or three dimensional (3D). The input medical images may be received directly from an image acquisition device, such as, e.g., image acquisition device 614 of FIG. 6, used to acquire the input medical images. Alternatively, the input medical images may be received by loading medical images previously stored on a memory or storage of a computer system (e.g., a picture archiving and communication system, PACS) or by receiving the input medical image data via network transmission from a remote computer system. In some embodiments, the input medical images may be patches extracted from a medical image.

At step 204, a candidate malignant lesion is detected from the one or more input medical images. The candidate malignant lesion is a "candidate" in that, while the lesion is detected as being malignant, the detected malignant lesion may be a false positive detection of a malignant lesion. The candidate malignant lesion may be detected using any suitable approach. For example, the candidate malignant lesion may be manually detected by a user (e.g., radiologist) or may be automatically or semi-automatically detected. Once detected, the candidate malignant lesion may be identified in any suitable manner, such as, e.g., in a heat map or a binary mask. In one embodiment, the candidate malignant lesion is detected using detection model 104 of FIG. 1 and identified in detections 106 in the form of a heat map.

In one embodiment, the candidate malignant lesions are automatically detected using a trained machine learning based detection network. The detection network in this embodiment comprises a UNet architecture with 2D residual blocks including 5 down sampling blocks and 5 up sampling blocks. Each residual block is implemented with a bottleneck architecture with a stack of 3 layers. The first residual block includes 16 filters, with doubling filter sizes for each remaining block.

At step 206, one or more patches associated with the candidate malignant lesion are extracted from the one or more input medical images. The patches are images depicting at least a portion of the input medical images. The patches may be extracted from the input medical images by, e.g., cropping the input medical images. The patches may be of any suitable (e.g., predetermined) dimension or dimensions. In one embodiment, the patches are patches 110 extracted from mpMRI images 102 of FIG. 1.

In one embodiment, the patches associated with the candidate malignant lesion include a patch depicting the candidate malignant lesion centered around a center of the candidate malignant lesion. For example, the patch depicting the candidate malignant lesion may be extracted from a 2D mpMRI slice $I_S$ and centered around a center of the candidate malignant lesion. In one embodiment, the patches associated with the candidate malignant lesion also include patches from medical images neighboring the medical image depicting the candidate malignant lesion for contextual information. For example, the patches associated with the candidate malignant lesion may include a patch extracted from the 2D mpMRI slice $I_S$, as well as patches extracted from neighboring adjacent 2D mpMRI slices $I_{S+1}$, $I_{S-1}$. The patches extracted from the neighboring mpMRI slices $I_{S+1}$, $I_{S-1}$ are extracted at a location corresponding to (i.e., at a same relative location to) the location that the patch depicting the candidate malignant lesion was extracted from the mpMRI slice $I_S$. The patch extracted from 2D slice $I_S$ and the patches extracted from neighboring 2D slices $I_{S+1}$, $I_{S-1}$, may be combined as separate channels of a multi-channel single patch. Such a multi-channel patch is referred to as being 2.5D, since the multi-channel patch comprises a channel for the patch extracted from 2D slice $I_S$ depicting the candidate malignant lesion along with channels for patches extracted from neighboring 2D slices $I_{S+1}$, $I_{S-1}$, providing contextual information. Advantages of the 2.5D multi-channel patch include: 1) in the case of true positive malignant lesions, image features of the malignant lesions may extend to the neighboring slices, facilitating the classification of the malignant lesions as true positive detections (at step 208), and 2) the malignant lesions may be classified (at step 208) based on inconsistencies and lack of coherent signatures across neighboring slices.

In one embodiment, in addition to or alternatively to the 2.5D multi-channel patch, the patches associated with the candidate malignant legion includes patches having a plurality of different fields of view. The field of view of a patch is the observable region depicted in the patch. The field of view of the patches having a plurality of different fields of view may comprise common portions. For example, patches of different dimensions may be extracted from the input medical images and centered around a common point (e.g., a center pixel of the candidate malignant lesion) and therefore, at least a center portion of the field of view of the patches is common to the patches. In one embodiment, the patches associated with the candidate malignant lesion may be extracted by cropping the input medical images at a plurality of different dimensions (e.g., 32×32 pixels, 48×48 pixels, and 64×64 pixels) to provide for images of a plurality of different fields of view. In one example, patches depicting the candidate malignant legion may be extracted from slice $I_S$ at a plurality of different dimensions. In another example, patches extracted from slice $I_S$ depicting the candidate malignant legion and patches extracted from neighboring slices $I_{S+1}$, $I_{S-1}$, may be extracted at a plurality of different dimensions. An image cropped at a relatively smaller dimension (e.g., 32×32 pixels) will have a smaller field of view while an image cropped at a relatively larger dimension (e.g., 64×64 pixels) will have a larger field of view. Once extract, the one or more of the patches may be resized to a same dimension (e.g., 48×48 pixels).

At step 208, the candidate malignant lesion is classified as being a true positive detection of a malignant lesion or a false positive detection of the malignant lesion based on the one or more extracted patches using a trained machine learning network. In one embodiment, the trained machine learning network is false positive reduction model 112 of FIG. 1. In one embodiment, the trained machine learning network is implemented according to the network architecture of a false positive reduction network shown in FIG. 3, described in further detail below. In another embodiment, the trained machine learning network is implemented according to the pyramidal feature hierarchical approach shown in FIG. 4, described in further detail below.

At step 210, results of the classification are output. In one embodiment, the results of the classification may comprise a heat map or binary mask identifying the true positive detection of the malignant lesion. For example, the results of the classification may be detections 114 in FIG. 1. The results of the classification can be output by displaying the results of the classification on a display device of a computer system, storing the results of the classification on a memory or storage of a computer system, or by transmitting the results of the classification to a remote computer system.

In one embodiment, where the candidate malignant lesion is classified as being a true positive detection of a malignant lesion, the malignant lesion may be evaluated, e.g., to assess the likelihood of clinically significant cancer. For example, the malignant lesion may be evaluated by PI-RADS scoring model 116 of FIG. 1 to assess the malignant lesion with a score from PI-RADS 1 to PI-RADS 5 indicating the likelihood of clinically significant cancer. Other evaluation or scoring techniques may also be employed.

Figure 3:
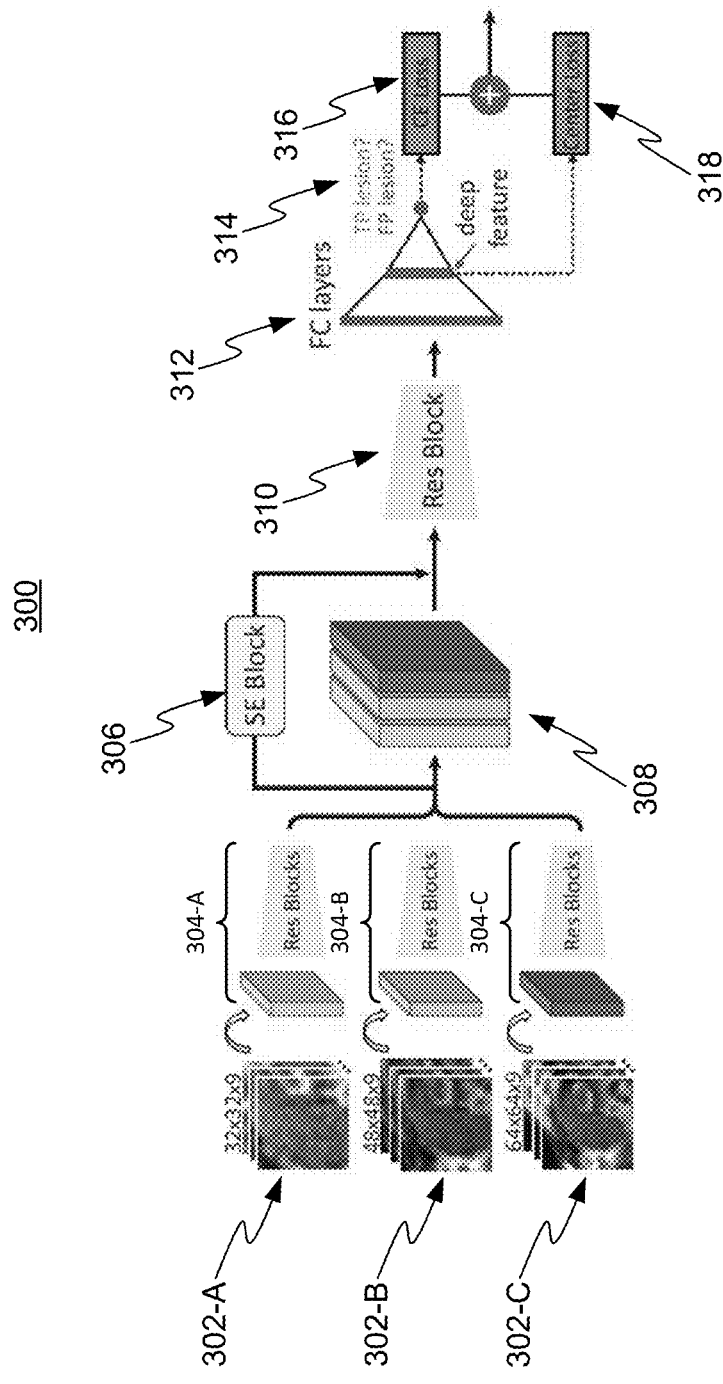
FIG. 3 shows a network architecture of a machine learning based false positive detection network for classifying candidate malignant lesions as being true positive detections of a malignant lesion or false positive detections of the malignant lesion, in accordance with one or more embodiments.

FIG. 3 shows a network architecture 300 of a machine learning based false positive detection network for classifying candidate malignant lesions as being true positive detections of a malignant lesion or false positive detections of the malignant lesion, in accordance with one or more embodiments. In one embodiment, network architecture 300 is the network architecture of the machine learning based false positive reduction model 112 of FIG. 1 or the network architecture of the trained machine learning network applied at step 208 of FIG. 2. Network architecture 300 may be implemented using one or more computing devices, such as, e.g., computer 602 of FIG. 6. Network architecture 300 may be of a convolutional neural network (CNN) or any other suitable machine learning based network.

In network architecture 300, residual block groups 304-A, 304-B, and 304-C respectively receive 2.5D patches 302-A, 302-B, and 302-C associated with a candidate malignant lesion. Patches 302-A, 302-B, and 302-C were extracted from a medical image with dimensions of 32×32×9, 48×48×9, and 64×64×9 pixels respectively and therefore have different fields of view, where 9 denotes the number of channels in each patch (each patch includes three slices from three MR images (e.g., T2 weighted (T2w), apparent diffusion coefficient (ADC), and diffusion weight imaging (DWI) B-2000)). Each of patches 302-A, 302-B, and 302-C include a channel for a patch depicting the candidate malignant lesion extracted from a medical image and channels for patches extracted from neighboring images (e.g., neighboring slices). Patches 302-A, 302-B, and 302-C are resized into a same dimension (e.g., 48×48 pixels) before being input into respective residual block groups 304-A, 304-B, and 304-C. Each group of residual block groups 304-A, 304-B, and 304-C comprises three consecutive residual blocks, the first of which has 16 filters and each remaining block having doubling filter sizes of its previous block. The features output from residual block groups 304-A, 304-B, and 304-C are concatenated. The concatenated features are represented by feature stack 308 and are input into squeeze-and-excitation (SE) block 306 to allocate different weights to different fields of view. SE block 306 shrinks the feature dimension of the concatenated features, learns model channel-association weights, and uses gate mechanisms to produce channel-wise weights. The feature stack 308 and weighted features resulting from SE block 306 are input into residual block 310 for further feature fusion. The output of residual block 310 is flattened using global average pooling and fed into two fully connected layers 312 with a size of 128 and 1 respectively to achieve the final classification 314. Classification 314 classifies the candidate malignant lesion as being a true positive detection of a malignant lesion or a false positive detection of the malignant lesion. Advantageously, the parallel design of network architecture 300 allows the network to receive a plurality of patches 302-A, 302-B, and 302-C having different fields of view. Images of a smaller field of view depict local lesion features whereas images with a larger field of view depict differences between the lesion and its surrounding. SE block 306 adjusts the weight of features to emphasize the importance of features from the different fields of view.

The false positive detection network of network architecture 300 is trained during a prior offline or training stage using a set of annotated training images. The set of training images may comprise true positive and false positive detections of malignant lesions as positive and negative training samples. In one embodiment, the training images may be generated using a trained detection network, such as, e.g., the detection network applied at step 204 of FIG. 2. The detection network may receive as input 3D volumes and output a heat map volume with detected malignant lesions identified with non-zero values. The heat map may then be thresholded to generate a set of 3D connected components.

True positive detections of malignant lesions are identified where the detected malignant lesions are within an annotated radius of, e.g., 5 mm away from a center of an actual malignant lesion. Otherwise, the detected malignant lesions were considered false positive detections of malignant lesions.

The false positive detection network may be trained using a cross entropy (CE) loss function 316 (e.g., binary cross entropy loss, BCE) as the main loss function. The goal is to minimize false positive detections of malignant lesions while having minimal impact on the overall detection sensitivity. To achieve this, a weight of α was used to provide a larger penalty on misclassified positive samples. The binary cross entropy loss function $L_{BCE}$ is defined in Equation (1):

$$L_{BCE} = \alpha y_i \log(p_i) + (1-y_i)\log(1-p_i) \quad \text{Equation (1)}$$

where $p_i \in [0,1]$ is the predicted lesion probability and $y \in \{0, 1\}$ is the ground truth label.

In addition to CE loss function 316, a center loss function 318 may be utilized as a secondary loss function to enhance the discriminative power between classes while minimizing the distances between samples from the same class. It is assumed that intra-class variation is smaller for true positive samples as compared to false positive samples and therefore higher weights are defined for true positive samples. The center loss function $L_C$ is defined in Equation (2):

$$L_C = \tfrac{1}{2}(\beta \Sigma_{i=1}^m y_i \|x_i - c_1\|_2^2 + \Sigma_{i=1}^m (1-y_i)\|x_i - c_0\|_2^2) \quad \text{Equation (2)}$$

where $x_i \in \mathbb{R}^d$ is the deep feature and $c_0, c_1 \in \mathbb{R}^d$ denote two class centers of deep features.

The total loss function $L_{total}$ for training network architecture 300 is a combination of the binary cross entropy loss function $L_{BCE}$ and the center loss function $L_C$. The total loss function $L_{total}$ is defined in Equation (3):

$$L_{total} = L_{BCE} + \lambda L_C \quad \text{Equation (3)}$$

where λ is a hyper-parameter tuned to control the balance between the binary cross entropy loss function $L_{BCE}$ and the center loss function $L_C$.

Figure 4:
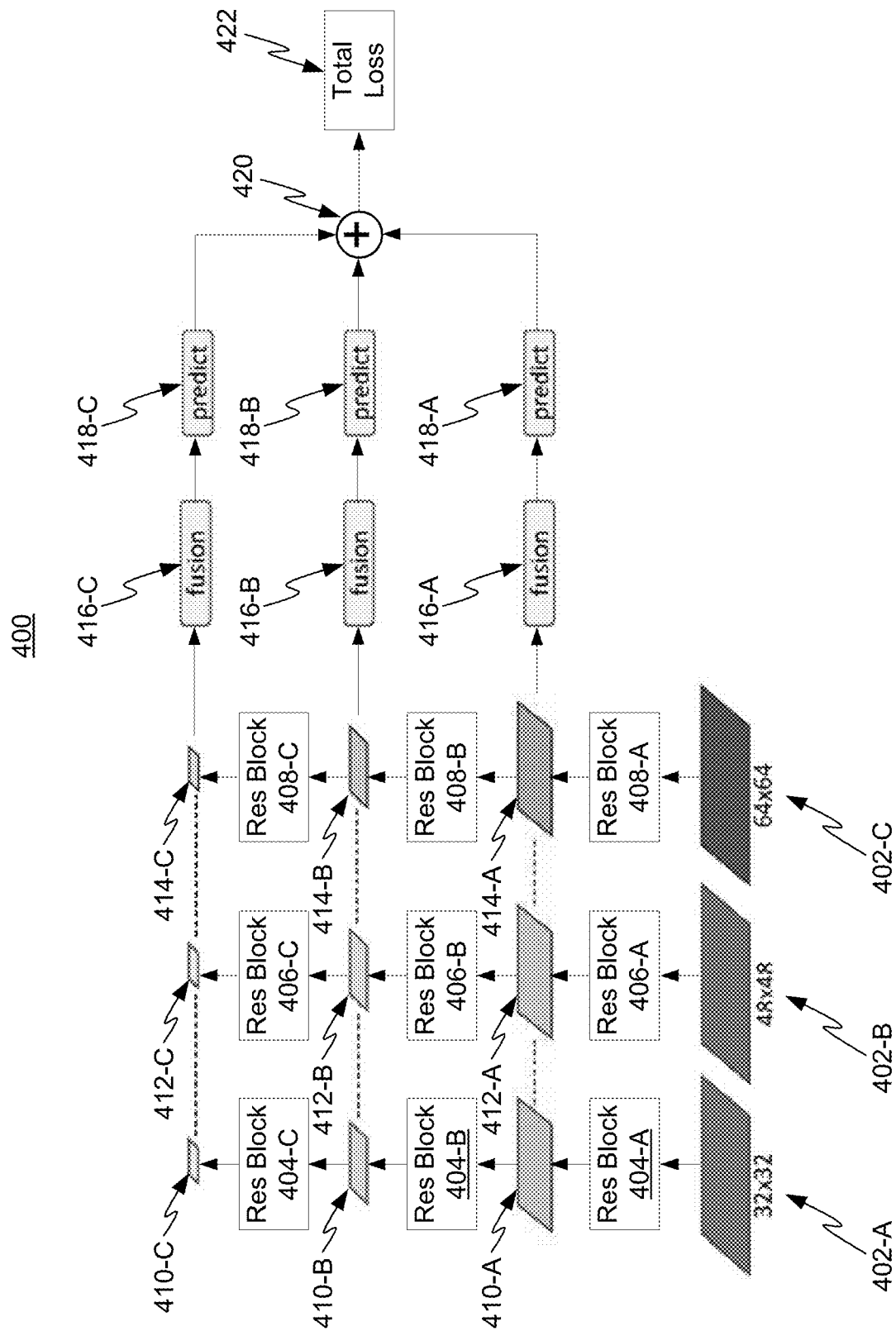
FIG. 4 shows a framework of a pyramidal feature hierarchical approach for training a false positive detection network for classifying candidate malignant lesions as being true positive detections of a malignant lesion or false positive detections of the malignant lesion, in accordance with one or more embodiments.

FIG. 4 depicts a framework 400 of a pyramidal feature hierarchical approach for training a false positive detection network for classifying candidate malignant lesions as being true positive detections of a malignant lesion or false positive detections of the malignant lesion, in accordance with one or more embodiments. In one embodiment, framework 400 may be applied for training the machine learning based false positive reduction model 112 of FIG. 1 or the trained machine learning network applied at step 208 of FIG. 2. Instead of using the total loss function of Equation (3) based on the binary cross entropy loss function $L_{BCE}$ and the center loss function $L_C$ to train network architecture 300 of FIG. 3, framework 400 determines a total loss function for training a false positive detection network based on a classification error calculated at each layer of feature extraction for each input patch.

In framework 400, patches 402-A, 402-B, and 402-C were initially extracted from a medical image with dimensions of 32×32, 48×48, and 64×64 pixels respectively and resized to a same dimension (e.g., 48×48 pixels). Each patch 402-A, 402-B, and 402-C is input into a respective residual block group 404, 406, and 408 each comprising three consecutive residual blocks, the first of which has 16 filters and each remaining block having doubling filter sizes of its previous block. The residual blocks in each residual block group 404, 406, and 408 extract features from respective patches 402-A, 402-B, and 402-C at a progressively higher level. In particular, patch 402-A is input into residual block group 404 whereby residual block 404-A extracts features 410-A, residual block 404-B extracts features 410-B, and residual block 404-C extracts features 410-C. Patch 402-B is input into residual block group 406 whereby residual block 406-A extracts features 412-A, residual block 406-B extracts features 412-B, and residual block 406-C extracts features 412-C. Patch 402-C is input into residual block group 408 whereby residual block 408-A extracts features 414-A, residual block 408-B extracts features 414-B, and residual block 408-C extracts features 414-C. Features 410-A, 412-A, and 414-A are relatively lower level features representing detail texture features of patches 402-A, 402-B, and 402-C respectively. Features 410-C, 412-C, and 414-C are relatively higher level features representing the overall content of patches 402-A, 402-B, and 402-C respectively.

The features at each level are combined. In particular, features 410-A, 412-A, and 414-A are combined at fusion 416-A and fed to a prediction layer 418-A, features 410-B, 412-B, and 414-B are combined at fusion 416-B and fed to a prediction layer 418-B, and features 410-C, 412-C, and 414-C are combined at fusion 416-C and fed to a prediction layer 418-C. In fusions 416-A, 416-B, and 416-C, the features may be fused by concatenation or more advanced methods (e.g., using an SE block). Prediction layers 418-A, 418-B, and 418-C comprise pooling layers to flatten the feature maps and fully connected layers for final classification, similar to fully connected layers 312 of FIG. 3. The classification error of each prediction layer 418-A, 418-B, and 418-C can be calculated using binary cross entropy loss (similar to Equation (1)). Three loss functions are combined at combiner 420 to determine the total loss 422. Total loss 422 may be used to train the false positive reduction network for classifying candidate malignant lesions as being true positive detections of a malignant lesion or false positive detections of the malignant lesion. In one embodiment, total loss 422 may be combined with center loss function $L_C$ is defined in Equation (2) to further improve training performance.

The embodiments described herein were experimentally validated. Datasets from seven data sources with 2170 cases in total were used for the analysis. 1736 cases were used for training (80%) and 434 cases for validation (20%). Another 243 cases were used from another data source as the test dataset to evaluate the performance of various models. All images and corresponding clinical reports were reviewed by a radiologist with at least four years of experience in radiology and a subspecialty training in prostate MRI examinations. Lesion contours were manually re-annotated in 3D based on the original clinical reports. All images were registered to the T2w images and resampled to a voxel spacing of 0.5 mm×0.5 mm×3 mm, with an image size of 240×240×30. The T2w images were linearly normalized to [0,1] using 0.05 and 99.5 percentiles of the image's intensity histogram as the lower and upper thresholds. Since the actual ADC is highly relevant to clinical significance of lesions, ADC intensity was normalized using a constant value of 3000. DWI B-2000 images were first normalized to the median intensity in the prostate region of the corresponding DWI B-50 images, and then normalized by a constant value to map the range of intensities into [0,1].

The detection network for detecting candidate malignant lesions was trained and fixed before conducting experiments on the false positive reduction network. Four types of image contrasts were used as inputs: T2w, DWI ADC, DWI B-2000 MR images, and a binary prostate region mask providing anatomical information. The prostate mask was generated based on T2w volumes using a learning-based method. The overall model was trained for 200 epochs with lesion masks as training labels. Detection model selection was performed based on the highest dice coefficient on the validation set.

Experiments for the false positive reduction network was conducted using the patches generated from the outputs of the detection network. 80% of the detections were used for training and the other 20% for validation. The false positive reduction network was trained using the Adam optimizer for 100 epochs, with L2 regularization of $10^{-4}$. Rotation range [−45°, 45°], shift range [−5,5], and vertical flips were adopted for data augmentation. Each input sample had 9 channels including all sequences from the previous and next slices while the ground truth label was only from the middle slices. The number of samples from positive and negative classes were balanced within each batch during the training. In the experiments, the dimension reduction ratio was set to 8 when the SE block was included in the model. The weight for center loss was set to $\lambda=0.2$, and weights of the positive samples in BCEL and CL computation were assigned to $\alpha=3$ and $\beta=2$ respectively.

The baseline network was a network with 3 residual blocks followed by 2 fully connected layers with size 256 and 1 respectively. Inputs for the baseline network were 2D data without 2.5D contextual or multiscale images. An ablation study was conducted to verify the impact of 2.5D data, multiscale, SE block, and center loss. Area under curve (AUC) was evaluated on 2D sample level, 3D component level, and patient case level. Table 500 of FIG. 5 shows results on the evaluation of the effectiveness of 2.5D multiscale data, SE block, and center loss with a comparison of the proposed approach in accordance with embodiments described herein with the state of the art conventional approach on sample, component, and case level AUC. Component level suspicion scores were calculated by averaging the suspicion score of each 2D slice within the stack. Component level AUC reflects the overall false positive reduction network performance on discriminating true and false positive lesions. As shown in table 500, false positive detection performance improved from 0.829 to 0.837 by adding 2.5D contextual data, and further improved to 0.876 by using multiscale information in accordance with embodiments described herein. SE block and center loss showed their efficacy by increasing the sample level AUC from 0.887 to 0.895 and 0.891 respectively. The component level AUC also improved from 0.844 to 0.867. The most recent, state of the art conventional false positive reduction approach for lung nodule detection was applied for comparison, and table 500 demonstrates that the proposed approach in accordance with embodiments discussed herein is superior. The false positive reduction network results were combined with the upstream detection network to perform overall case level analysis. In this analysis, the case level suspicion score determines if a patient potentially has a clinically significant lesion. The maximum value of the detection network heat map was defined as the suspicion score. The case level AUC is shown in table 500. The first row of table 500 shows the case level performance without using a false positive reduction network. The results show a substantial increase in the overall case level detection performance by using a false positive reduction network.

The overall detection performance, after adding the false positive reduction network in accordance with the embodiments described herein, was also evaluated using a free-response receiver operator characteristics (FROC) analysis. The RROC reflects the relationship between sensitivity of detection and the false positive rate per patient. At sensitivity greater than 90%, the false positive rate per patient was reduced by 39.3% (1.17 versus 0.71). At sensitivity greater than 87%, the false positive rate per patient was reduced by 52.3% (1.09 versus 0.52).

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-2. Certain steps or functions of the methods and workflows described herein, including one or more of the steps or functions of FIGS. 1-2, may be performed by a server or by another processor in a network-based cloud-computing system. Certain steps or functions of the methods and workflows described herein, including one or more of the steps of FIGS. 1-2, may be performed by a client computer in a network-based cloud computing system. The steps or functions of the methods and workflows described herein, including one or more of the steps of FIGS. 1-2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
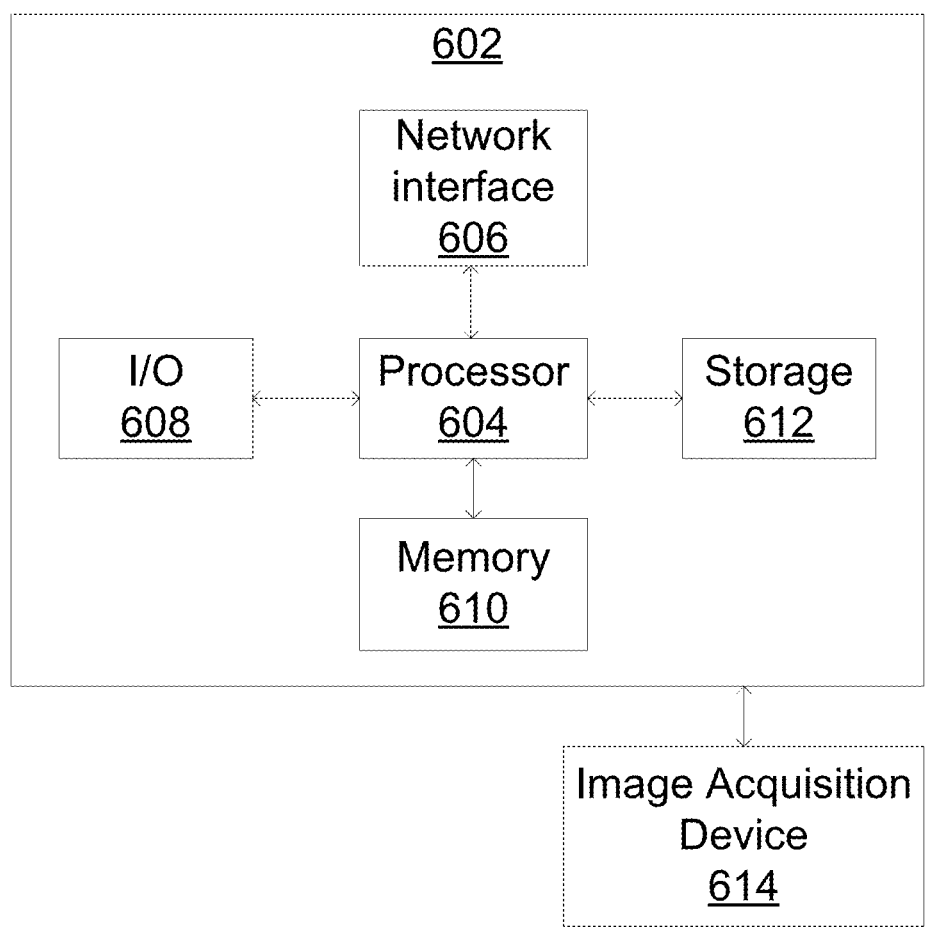
FIG. 6 shows a high-level block diagram of a computer.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 1-2 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 1-2. Accordingly, by executing the computer program instructions, the processor 604 executes the method and workflow steps or functions of FIGS. 1-2. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein, as well as the machine learning based networks described herein, such as, e.g., detection model 104 and false positive reduction model 112 of FIG. 1, network architecture 300 of FIG. 3, and framework 400 of FIG. 4, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   extracting one or more patches associated with a candidate malignant lesion from one or more medical images, the candidate malignant lesion representing a lesion detected as being malignant;
   classifying the candidate malignant lesion as being a true positive detection of a malignant lesion or a false positive detection of the malignant lesion based on the one or more extracted patches using a trained machine learning network; and
   outputting results of the classification.

2. The method of claim 1, wherein extracting one or more patches associated with a candidate malignant lesion from one or more medical images comprises:
   extracting a plurality of patches having different fields of view from the one or more medical images.

3. The method of claim 2, wherein extracting a plurality of patches having different fields of view from the one or more medical images comprises:
   cropping the one or more medical images at different dimensions.

4. The method of claim 1, wherein extracting one or more patches associated with a candidate malignant lesion from one or more medical images comprises:
   extracting a patch depicting the candidate malignant lesion from a particular image of the one or more medical images.

5. The method of claim 4, wherein extracting one or more patches associated with a candidate malignant lesion from one or more medical images comprises:
   extracting patches from images of the one or more medical images that neighbor the particular image.

6. The method of claim 1, further comprising:
   detecting the candidate malignant lesion in the one or more medical images using a machine learning based detection network.

7. The method of claim 1, wherein the one or more medical images comprises multi-parametric magnetic resonance images.

8. An apparatus, comprising:
- means for extracting one or more patches associated with a candidate malignant lesion from one or more medical images, the candidate malignant lesion representing a lesion detected as being malignant;
- means for classifying the candidate malignant lesion as being a true positive detection of a malignant lesion or a false positive detection of the malignant lesion based on the one or more extracted patches using a trained machine learning network; and
- means for outputting results of the classification.

9. The apparatus of claim 8, wherein the means for extracting one or more patches associated with a candidate malignant lesion from one or more medical images comprises:
- means for extracting a plurality of patches having different fields of view from the one or more medical images.

10. The apparatus of claim 9, wherein the means for extracting a plurality of patches having different fields of view from the one or more medical images comprises:
- means for cropping the one or more medical images at different dimensions.

11. The apparatus of claim 8, wherein the means for extracting one or more patches associated with a candidate malignant lesion from one or more medical images comprises:
- means for extracting a patch depicting the candidate malignant lesion from a particular image of the one or more medical images.

12. The apparatus of claim 11, wherein the means for extracting one or more patches associated with a candidate malignant lesion from one or more medical images comprises:
- means for extracting patches from images of the one or more medical images that neighbor the particular image.

13. The apparatus of claim 8, further comprising:
- means for detecting the candidate malignant lesion in the one or more medical images using a machine learning based detection network.

14. The apparatus of claim 8, wherein the one or more medical images comprises multi-parametric magnetic resonance images.

15. A non-transitory computer readable medium storing computer program instructions, the computer program instructions when executed by a processor cause the processor to perform operations comprising:
- extracting one or more patches associated with a candidate malignant lesion from one or more medical images, the candidate malignant lesion representing a lesion detected as being malignant;
- classifying the candidate malignant lesion as being a true positive detection of a malignant lesion or a false positive detection of the malignant lesion based on the one or more extracted patches using a trained machine learning network; and
- outputting results of the classification.

16. The non-transitory computer readable medium of claim 15, wherein extracting one or more patches associated with a candidate malignant lesion from one or more medical images comprises:
- extracting a plurality of patches having different fields of view from the one or more medical images.

17. The non-transitory computer readable medium of claim 16, wherein extracting a plurality of patches having different fields of view from the one or more medical images comprises:
- cropping the one or more medical images at different dimensions.

18. The non-transitory computer readable medium of claim 15, wherein extracting one or more patches associated with a candidate malignant lesion from one or more medical images comprises:
- extracting a patch depicting the candidate malignant lesion from a particular image of the one or more medical images.

19. The non-transitory computer readable medium of claim 18, wherein extracting one or more patches associated with a candidate malignant lesion from one or more medical images comprises:
- extracting patches from images of the one or more medical images that neighbor the particular image.

20. The non-transitory computer readable medium of claim 15, further comprising:
- detecting the candidate malignant lesion in the one or more medical images using a machine learning based detection network.

* * * * *